United States Patent [19]

Mizuno et al.

[11] Patent Number: 4,490,348

[45] Date of Patent: Dec. 25, 1984

[54] METHOD FOR EFFECTING HYDROGEN SORPTION AND DISSOCIATION ON AN ADSORBENT METAL

[75] Inventors: Tsutomu Mizuno; Hiroyuki Kusaka, both of Osaka, Japan

[73] Assignee: Iwatani Sangyo Kabushiki Kaisha, Japan

[21] Appl. No.: 462,970

[22] Filed: Feb. 1, 1983

[30] Foreign Application Priority Data

Feb. 12, 1982 [JP] Japan .................................. 57-21794
Feb. 12, 1982 [JP] Japan .................................. 57-21795

[51] Int. Cl.³ .......................... C01B 3/58; C01B 6/00; C01B 6/04; F17C 11/00
[52] U.S. Cl. ..................................... 423/645; 206/0.7; 420/900; 423/647; 423/648 R; 423/248
[58] Field of Search ................................ 423/644–647, 423/248, 648 R; 420/900; 206/0.7; 312/31.01, 31

[56] References Cited

U.S. PATENT DOCUMENTS 4,375,257 3/1983 Bruning et al. ........................ 206/0.7
4,383,606 5/1983 Hunter .................................. 206/0.7

Primary Examiner—Howard S. Williams
Assistant Examiner—T. L. Williams
Attorney, Agent, or Firm—Bacon & Thomas

[57] ABSTRACT

A method and apparatus for effecting hydrogen sorption and dissociation on an adsorbent metal at an elevated temperature, wherein the method is carried out in an apparatus including a vessel for containing an adsorbent metal, the vessel including a hydrogen intake path and a hydrogen discharge path, a pair of electrodes located at opposite ends of the vessel such that the vessel is insulated to the electrodes, and a source of power for supplying electric current to the electrodes, so as to effect electric current between the electrodes through the adsorbent metal.

5 Claims, 6 Drawing Figures

METHOD FOR EFFECTING HYDROGEN SORPTION AND DISSOCIATION ON AN ADSORBENT METAL

BACKGROUND OF THE INVENTION

1. Field of the Invention

The present invention relates to a method and apparatus for effecting hydrogen sorption and dissociation on an adsorbent metal, such as magnesium and magnesium-nickel alloy. More particularly, the present invention relates to a method and apparatus for use in carrying out hydrogen sorption and dissociation on an absorbent metal in an efficient manner. It is generally known to heat an adsorbent to a high temperature to effect hydrogen sorption or dissociation thereon. More specifically, the present invention relates to a method and apparatus for instantly producing an optimum condition at which hydrogen sorption and dissociation smoothly proceed.

2. Background of the Invention

It is known in the art that an adsorbent metal must be heated to an operative temperature to effect hydrogen sorption and separation thereon. In this specification the "sorption" means that hydrogen is adsorbed on an adsorbent metal, and the "dissociation" means that an adsorbed hydrogen is released from the adsorbent. The conventional practice to heat an adsorbent is the use of an extra heater which is provided on the vessel, with the use of heat medium as a heat source.

In such known systems the metal contained in the vessel is heated through heat transfer, which is called, in an indirect method. Such methods invoke a lot of heat loss, and take a relatively long time before the required temperature is obtained. Normally, after the heater is started at a room temperature, it takes more than a minute. In addition, an apparatus including the vessel and the heater as a whole becomes complicated and large-scaled, which reflects in the cost. In order to accelerate the heating of the adsorbent in the vessel, there are many proposals, one of which is to provide as many heating spots as possible, or to increase the areas of heat transfer, or to step up the output of the heater. However, these proposals cannot solve the problems pointed out above, and what is worse, the structure becomes more complicated, large-scaled and expensive.

OBJECTS AND SUMMARY OF THE INVENTION

The present invention is directed toward solving the problems pointed out above, and has for its object to provide an improved method and apparatus for allowing hydrogen to be adsorbed on and released from, an adsorbent metal in a shortened period of time.

Another object of the present invention is to provide an improved method and apparatus which are embodied economically without losing the efficiency in effecting hydrogen sorption and separation on an adsorbent metal.

Other objects and advantages of the present invention will become apparent from the detailed description given hereinafter; it should be understood, however, that the detailed description and specific embodiments are given by way of illustration only, since various changes and modifications within the spirit of the invention will become apparent to those skilled in the art from this detailed description.

According to one advantageous aspect of the present invention, there is a method for effecting hydrogen sorption and dissociation on a metal, the method comprising: placing an adsorbent metal in a vessel, providing a pair of electrodes in the vessel with the interposition of insultating material therebetween; connecting the adsorbent metal to each electrode so as to effect electric current therethrough; and introducing hydrogen into the vessel not earlier than the energizing of the adsorbent metal.

According to another advantageous aspect of the present invention, there is a method for effecting hydrogen sorption and separation on a metal, the method comprising: placing a hydrogen-adsorbed metal in a vessel, providing a pair of electrodes in the vessel with the interposition of insulating material therebetween; and connecting the metal to each electrode so as to effect electric current therethrough.

According to a further advantageous aspect of the present invention, there is an apparatus for effecting hydrogen sorption and separation on a metal, the apparatus comprising: a vessel for containing an adsorbent metal, the vessel including a hydrogen intake path and a hydrogen discharge path, a pair of electrodes located at opposite ends of the vessel wherein the vessel is insulated from each electrode, the electrodes being adapted to have the adsorbent metal placed therebetween so as to effect electric current therethrough, and a source of power connected to the electrodes.

DETAILED DESCRIPTION OF THE INVENTION

Figure 1:
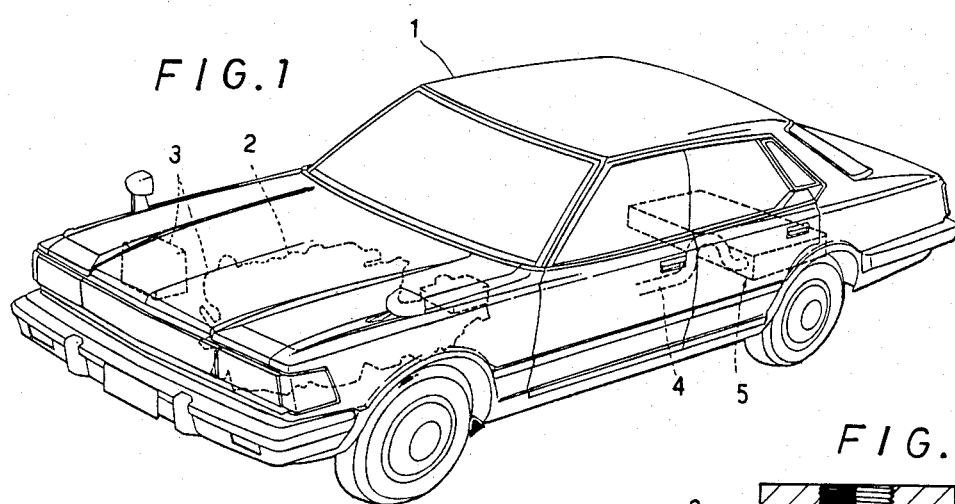
FIG. 1 is a perspective view showing a motor car including an apparatus according to the present invention.
Figure 2:
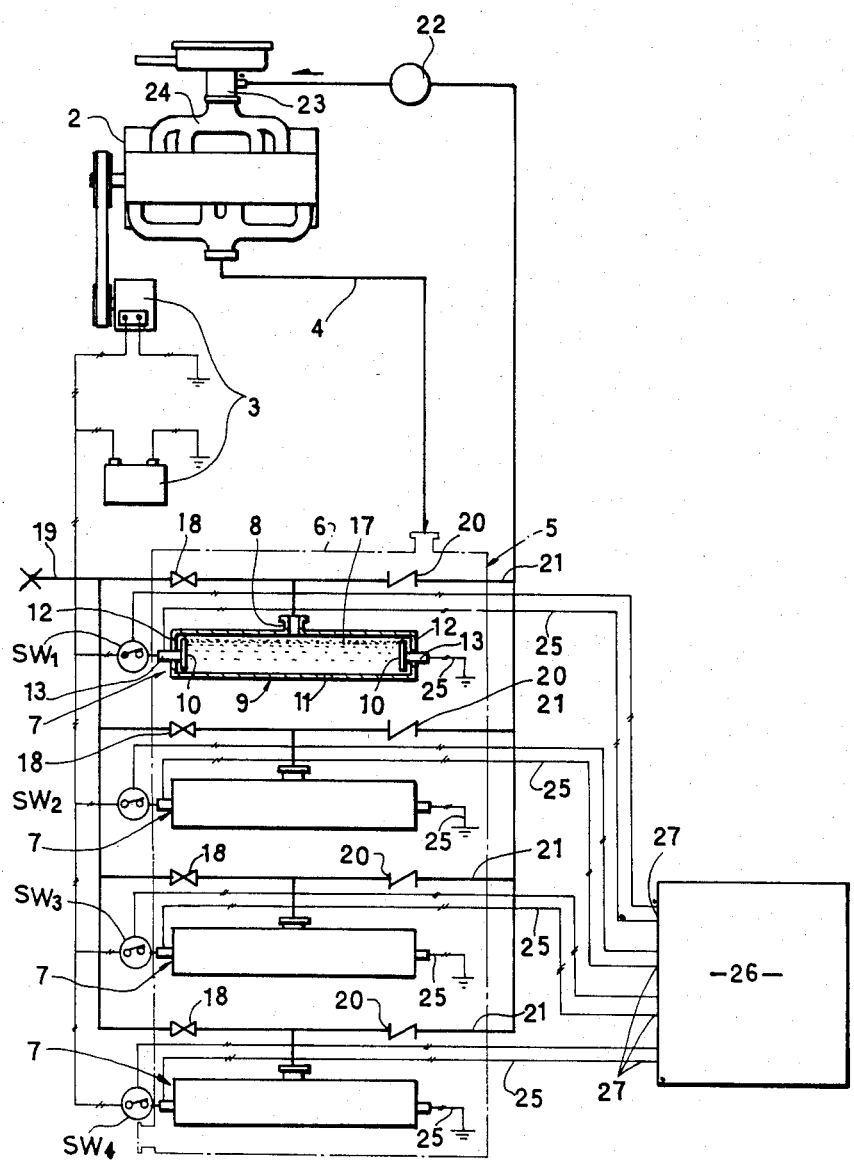
FIG. 2 is a diagrammatic view showing a system including a plurality of apparatus according to the present invention.

Referring to FIG. 1, the motor car 1 includes a hydrogen engine 2 and an electric power source 3 consisting of a battery and a d.c. generator. The hydrogen engine 2 is provided with an exhaust pipe 4 leading to a hydrogen sorption section 5 mounted in the rear section of the car. The hydrogen sorption section 5 is schematically illustrated in FIG. 2.

The hydrogen sorption section 5 is covered by a casing 6, in which hydrogen sorption apparatus are provided in a desired number; the illustrated embodiment has four apparatus. Reference will be made only to one of them.

Figure 3:
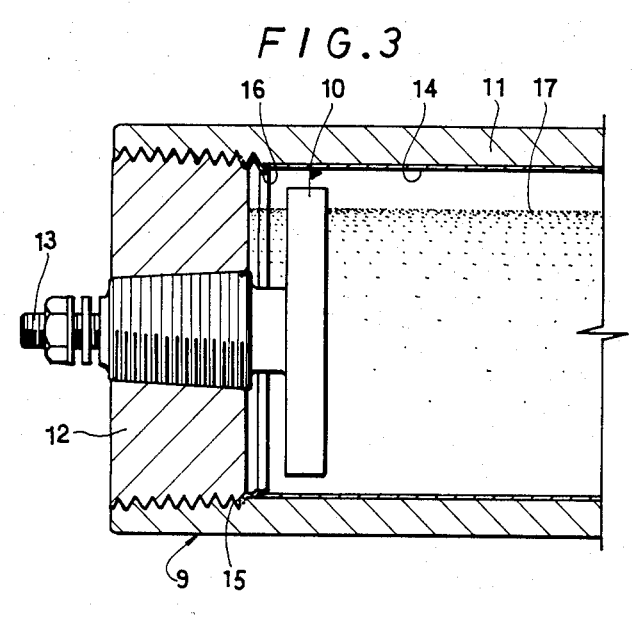
FIG. 3 is a fragmentary cross-section on an enlarged scale of the main part of a vessel included in the embodiment of the present invention.

The hydrogen sorption apparatus, generally designated by the reference numeral 7, includes a cylindrical vessel 9 and a pair of electrodes 10 provided at opposite ends of the vessel 9. The reference numeral 8 designates a hydrogen intake and discharge port. As shown in FIG. 3, the cylindrical vessel 9 is defined by a cylindrical side wall 11 and end walls 12 through which the electrodes 10 are passedly fastened. The electrodes 10 are insulated from the vessel 9. Each terminal 13 of the electrodes 10 is extended outwardly of the vessel 9.

The inner surface of the cylindrical side wall 11 is coated with an insulating layer 14, such as alumite. In FIG. 3 the reference numeral 15 designates a specially machined section designed for allowing the end wall 12 to be screwed in the end portion of the cylindrical vessel 9. Likewise, this section 15 is coated with an insulating layer 16, such as an insulating adhesive. The end walls 12 are preferably made of ceramic or any other insulating material. In this way the entire inner surfaces of the cylindrical vessel 9 are covered with an insulating material or substance.

The reference numeral 17 designates a powdered adsorbent packed between the electrodes 10 such that the electrodes are electrically connected through the adsorbent.

A hydrogen intake path 19 including a valve 18 and a hydrogen discharge path 21 including a check valve 20 are connected to the port 8, wherein the hydrogen discharge path 21 is connected to the intake pipe 24 of the engine 2 through a pressure adjuster 22 and an air-hydrogen mixer 23.

Each terminal 13 of the electrodes 10 is connected to the power source 3 through controller switches $SW_1$, $SW_2$, $SW_3$ and $SW_4$ located in series. When the switch $SW_1$, $SW_2$, $SW_3$ and $SW_4$ are closed, an electric current is passed between the electrodes 10 through the intermediately located adsorbent 17.

By virtue of the powder state the adsorbent 17 exhibits high resistance to the electric current, thereby generating heat in itself. In this way the adsorbent 17 is readily heated to a desired temperature at which the adsorbent is ready to release the adsorbed hydrogen. When the adsorbent is magnesium-nickel alloy, it is readily heated to 300° C. or around. It has been demonstrated that it takes only a few seconds before the adsorbent reaches at a desired temperature. At a room temperature the hydrogen releasing equilibrium pressure, which is normally below the atmospheric pressure, is raised to above the atmospheric pressure, thereby causing the hydrogen adsorbed in the adsorbent to release actively.

The electric resistance between the electrodes 10 becomes large in value in proportion to the amount of the adsorbed hydrogen in the adsorbent 17, and becomes small in proportion of the diminishing amount of the adsorbed hydrogen. Presumably, this relationship between the electric resistance of the adsorbent and the amount of the adsorbed hydrogen is concerned with the state or amount of the free electrons present in the adsorbent 17. As the adsorbent 17 adsorbs hydrogen more and more, the number of free electrons therein diminishes, thereby resulting in the increased resistance.

To make use of the relationship between the resistance and the amount of the adsorbed hydrogen, a detector line 25 for detecting the electric resistance between the electrodes 10 is provided in the unearthed terminal 13, thereby examining the amount of an adsorbed hydrogen in the adsorbent 17 through the detection of the electric resistance. The detection line 25 is connected at 27 to a controller 26.

Figure 4:
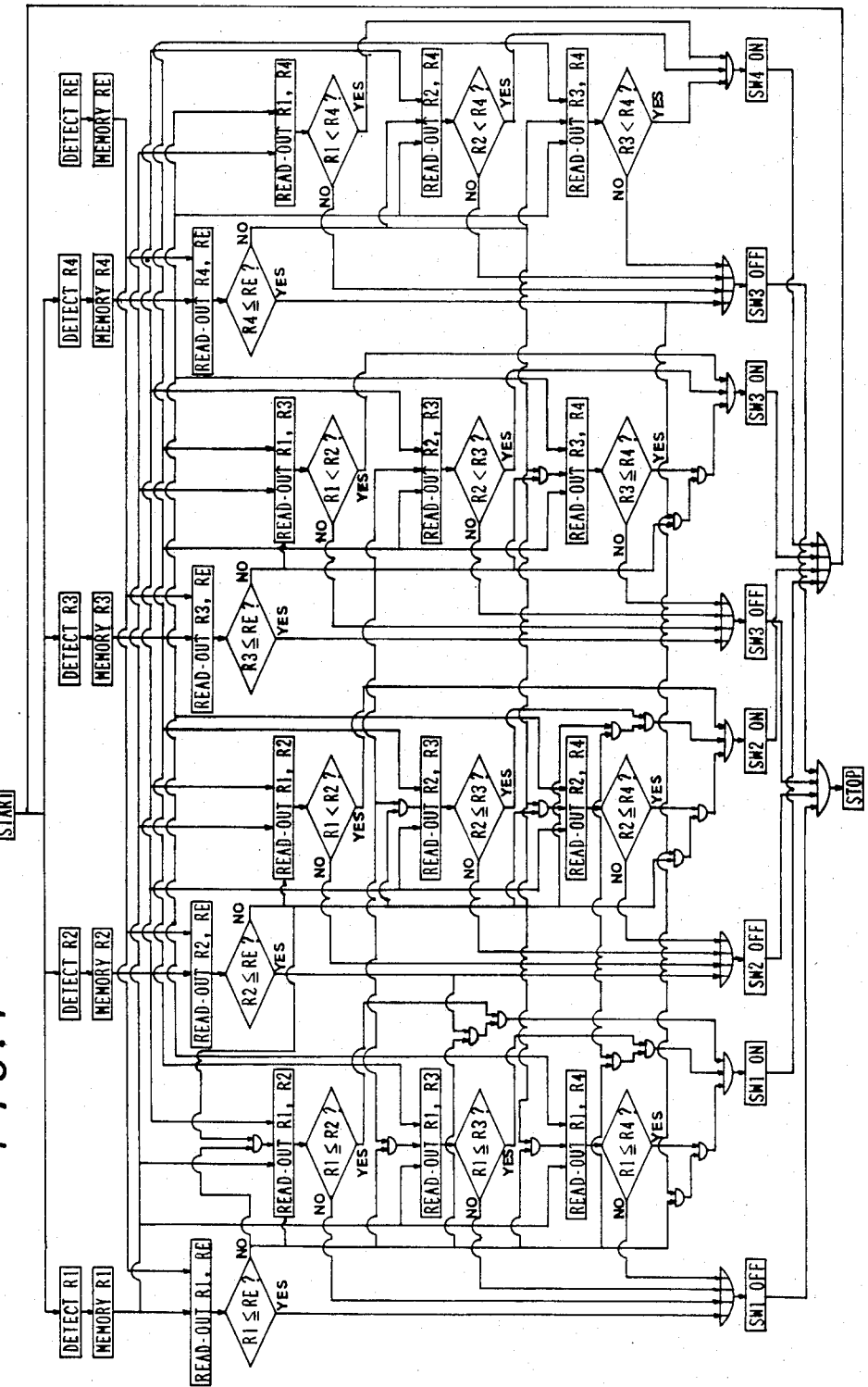
FIG. 4 is a sequential diagram for controlling the apparatus.

Referring to FIG. 4 the controller 26 is designed to detect the resistance $R_1$, $R_2$, $R_3$ and $R_4$ between the electrodes 10 in each apparatus 7 and compare it with a reference resistance RE to find whether the detected resistance exceeds the reference resistance or not. If the amount of the absorbed hydrogen has been found to be below the desired amount, the controller 26 turns off the respective switch.

For example, if the vessel 9 having the switch $SW_1$ is found to have hydrogen adsorbed therein less than the desired amount through the comparison between $R_1$ and RE, the compared result is signalled to turn off the switch $SW_1$ When one vessel 9 is found to have hydrogen more than the desired amount, the other vessels 9 are examined as to whether they have more hydrogen than the desired amount or not. If any of them has less hydrogen than the amount detected in the first vessel 9, the switch $SW_1$ for the first mentioned vessel 9 is turned off. If the other vessels 9 have more hydrogen than the amount detected in the first mentioned vessel as well as the desired amount, the switch $SW_1$ for the first-mentioned vessel 9 is turned on.

In FIG. 2, let the vessels 9 be referred to by the first, second, third and fourth from top to bottom. Assuming, for example, the first vessel has less hydrogen than the desired amount while the second, third and fourth vessels have more than the desired amount and the third and the fourth vessels have more hydrogen than the amount in the second vessel. In this case, the switch $SW_2$ for the second vessel 9 is turned on, and the switches $SW_3$, $SW_4$ for the third and the fourth vessels 9 are turned off. At this stage, the switch $SW_1$ for the first vessel 9 is off.

If the two or more vessels have more hydrogen than the desired amount, and if the amounts in them are equal, the switch for one of them is turned on while the switch(es) for the other(s) is turned off in accordance with the predetermined order.

For example, if each vessel is filled with hydrogen to a nonacceptible extent, the switch $SW_1$ is turned on while the other switches $SW_2$, $SW_3$ and $SW_4$ are turned off. In this way the hydrogen adsorbed in the first vessel 9 is released until the amount of hydrogen is below the desired amount, where the switch $SW_2$ is turned on so as to effect electric current through the second vessel 9 while the other switches $SW_1$, $SW_3$ and $SW_4$ are off.

After the electric current is stopped for the adsorbent 17 in the first vessel 9, the temperature operative to release the hydrogen adsorbed in the adsorbent 17 is maintained, and the releasing of hydrogen continues until the second vessel 9 initiates to release the hydrogen adsorbed therein. In this way the third and the fourth vessels release the hydrogen adsorbed therein, respectively.

So long as any of the vessels 9 has more hydrogen than the desired amount, the sequence shown in FIG. 4 is repeated until the amounts of hydrogen in all the vessels 9 are below the desired amount, where all the switches $SW_1$ to $SW_4$ are turned off. At this stage, the controller 26 is stopped.

For one application, a suitable sensor can be provided in the exhaust pipe leading from the engine 2 so as to detect a rise in the temperature of exhaust gas from the engine against a reference value. Through the detection the controller 26 is operated to turn off all the switches $SW_1$ to $SW_4$, and instead, each vessel can be heated by the exhaust gas. This leads to energy-saving.

When hydrogen is to be adsorbed on the adsorbent 17 contained in the vessel 9, the switches $SW_1$ to $SW_4$ are turned on by the controller 26 through the pressing of a key switch, irrespective of the internal resistance $R_1$, $R_2$, $R_3$, and $R_4$. In this way each adsorbent 17 in the vessels 9 are heated to a desired temperature, such as 200° C. to 300° C. When they are found to reach at the desired temperature, each valve 18 is opened to introduce hydrogen into each vessel 9 through the intake path 19. The adsorbents 17 initiate to adsorb the hydrogen at that temperature.

The self-heating nature of the adsorbent 17 advantageously activates the hydrogen sorption and releasing abilities thereof beyond a certain level.

Figure 5:
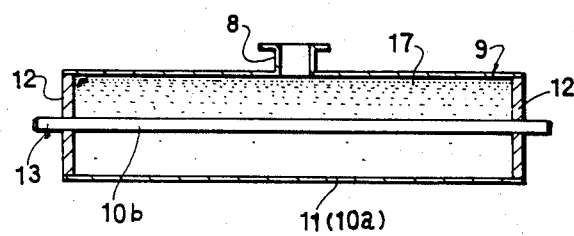
FIG. 5 is a cross-sectional view showing a modiffied version of the vessel.

As an alternative embodiment the cylindrical vessel 9 can be made of electrically conductive material in the side wall section 11, and of an insulting material in the end wall section 12. The side wall section 11 is used as an electrode $10_a$ grounded to the earth, and a rod $10_b$ is transversely passed from one end wall to the other as shown in FIG. 5. The rod $10_b$ is used as the paired electrode having terminal 13 at least at one of the end walls 12. According to this embodiment the construction of the vessel 9 is simplified.

Figure 6:
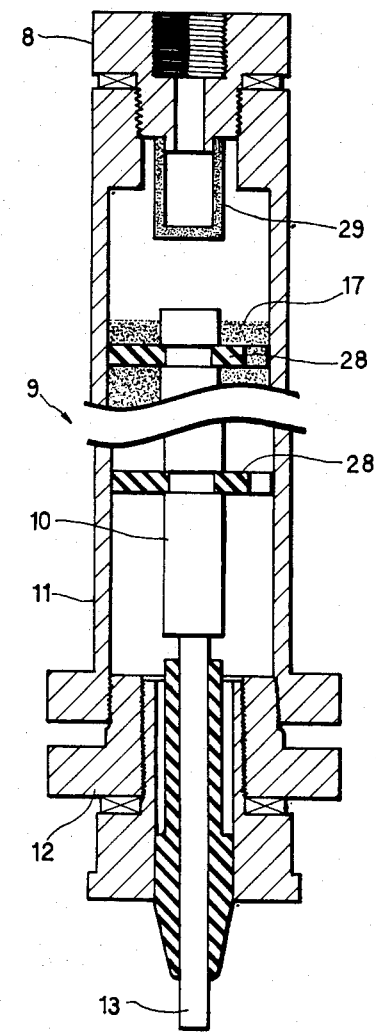
FIG. 6 is a cross-sectional view through a modified version of the hydrogen sorption apparatus according to the present invention.

FIG. 6 shows a further modified embodiment in which the vessel 9 has its cylindrical side wall 11 made of electrically conductive material. The cylindrical vessel 9 is constructed in a vertically erected form. A terminal 13 is downwardly extended through the lower end wall 12, wherein the terminal 13 is insulated thereto. The cylindrical side wall 11 constitutes one electrode, and the other electrode is constituted by a rod 10, which is connected to the downwardly extended terminal 13. The rod 10 is supported by insulating spacers 28, such as ceramic, coaxially of the cylindrical vessel 9. The reference numeral 8 designates a coupler provided in the upper end wall 12, and the reference numeral 29 designates a filter made of sintered stainless steel.

For application, the area of the electrodes and the distance therebetween are determined in accordance with the output of power supply, a required amount of hydrogen supply at the initial stage, and a period of time from the starting of the system up to the releasing of hydrogen.

The adsorbent can be in any of the forms-powder, particle or pellet, or alternativvely, it can be a lump of porosity or a sintered body.

The electric current can be either a d.c. current or an a.c. current.

A detector can be additionally provided on each apparatus 7 for detecting the temperatures of the adsorbent 17 therein to see whether the temperatures reach at a desired value. Through the detection the energizing of the electrodes is controlled. Alternatively, a detector for detecting the internal pressure in each vessel 9 can be provided so as to see whether the internal pressure has reached a pressure for hydrogen releasing equilibrium. Through the pressure detection the energizing of the electrodes is controlled, thereby avoiding overheating of the adsorbent. This also leads to energy-saving.

As evident from the foregoing, it will be appreciated that according to the present invention the adsorbent is virtually instantaneously heated to a desired temperature at which hydrogen sorption or releasing is effectively performed. In addition, the apparatus has a simplified, self-contained construction, thereby dispensing with an extra frequency heater or any other heater. Whether it is single or in plurality, the apparatus can be easily mounted in a relatively restricted space, such as motorcars.

What is claimed is:

1. In a method for effecting hydrogen sorption on an adsorbent metal at an elevated temperature, the method comprising:
   placing said adsorbent metal in a vessel;
   providing a pair of electrodes in said vessel, wherein said vessel is insulated from said electrodes;
   connecting said electrodes to a source of electrical power;
   connecting said adsorbent metal to said electrodes so as to effect electric current therethrough; and
   introducing hydrogen into said vessel not earlier than the energizing of said adsorbent metal.

2. In a method for effecting the dissociation of hydrogen adsorbed in an adsorbent metal at an elevated temperature, the method comprising:
   placing said adsorbent metal in a vessel;
   providing a pair of electrodes at opposite ends of said vessel, wherein said vessel is insulated from said electrodes;
   connecting said electrodes to a source of electrical power;
   connecting said adsorbent metal to said electrodes so as to effect electric current therebetween; and
   collecting the hydrogen dissociated from said adsorbent metal.

3. The method as defined in claim 1, wherein said adsorbent material is in the form of a powder, particle or pellet.

4. The method as defined in claim 2, wherein said adsorbent material is in the form of a powder, particle or pellet.

5. The method as defined in claim 1, wherein said hydrogen is introduced into said vessel from a hydrogen engine.

* * * * *